United States Patent
Morales et al.

(10) Patent No.: US 8,823,970 B2
(45) Date of Patent: Sep. 2, 2014

(54) PS TO PDF CONVERSION WITH EMBEDDED JOB TICKETING PRESERVATION

(75) Inventors: Javier A. Morales, Irondequoit, NY (US); William S. Jacobs, Los Angeles, CA (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1555 days.

(21) Appl. No.: 11/643,176

(22) Filed: Dec. 21, 2006

(65) Prior Publication Data

US 2008/0151284 A1 Jun. 26, 2008

(51) Int. Cl.
*G06F 3/12* (2006.01)

(52) U.S. Cl.
CPC ............ *G06F 3/1206* (2013.01); *G06F 3/1245* (2013.01); *G06F 3/1247* (2013.01); *G06F 3/1285* (2013.01); *G06F 3/1286* (2013.01); *G06F 3/1287* (2013.01)
USPC .......................................... 358/1.15; 358/1.1

(58) Field of Classification Search
None
See application file for complete search history.

(56) References Cited

U.S. PATENT DOCUMENTS 6,993,196 B2 * 1/2006 Sun et al. ...................... 382/233
7,142,691 B2 * 11/2006 Levy ............................. 382/100
7,375,842 B2 * 5/2008 Kloosterman et al. ........ 358/1.18
7,646,497 B2 * 1/2010 Shima .......................... 358/1.13
2003/0167271 A1 * 9/2003 Arnold et al. ................... 707/10
2003/0189724 A1 * 10/2003 Kloosterman et al. ....... 358/1.18
2007/0195352 A1 8/2007 Liu

OTHER PUBLICATIONS

Adobe XMP Specification, Jan. 2004, pp. 1, 2, 9, 12, 35, 44, 82.*
Adobe Systems Incorporated, XMP Adding Intelligence to Media, Jan. 2004, 7 pages.*

* cited by examiner

*Primary Examiner* — Marcus T Riley
(74) *Attorney, Agent, or Firm* — Fay Sharpe LLP

(57) ABSTRACT

A system and method for converting a first print file having embedded job ticket data generated in a first format into a second print file of a second format while preserving the embedded job-ticket data. A computer system and a computer program are configured to convert the first print file to the second print file by translating the first print file to the second print file, searching the first print file for the embedded job ticket data and associated page ranges, and inserting the embedded job ticket data and associated page ranges identified by the searching into the translated second print file. A printing system includes a digital frontend, an image output terminal, and an interpreter unit. The interpreter unit is configured to parse the second print file for the inserted job ticket data and program a print job based on the parsed job ticket data.

9 Claims, 3 Drawing Sheets

PS TO PDF CONVERSION WITH EMBEDDED JOB TICKETING PRESERVATION

BACKGROUND

Postscript®-based publishing workflows known in the art use job ticketing embedded in Postscript® (PS) files to control output devices. The embedded job ticketing may, e.g., take the form of setpagedevice (SPD) commands that are read by an interpreter and used to execute page programming or finishing programming, whether at the document, section or page exception level. As Postscript®-based publishing workflows are moved to Portable Document Format (PDF)-based workflows, this embedded programming functionality is being left behind without any clear replacement. Separate job ticketing for PDF workflows may not allow all the possible command combinations that can be achieved by writing the commands into the Page Description Language (PDL) file. Furthermore, the PDF job ticket, which is external to the PDF file proper, may lose its association with the PDF file as the file winds its way through the end-to-end workflow. The above-mentioned PostScript® and PDF file formats are described in more detail in *PostScript® Language Reference*, Third Edition, and *PDF Reference*, fifth edition, Adobe® Portable Document Format, Version 1.6, both by Adobe Systems Incorporated.

The loss of programming functionality is particularly noticeable with mainframe computers. Mainframes can output PS files with embedded programming for user-specified parameters such as, e.g., mapping to different media, chapter starts, page offset, finishing options, stapling groups (variable group sizes), etc. Since migrating to PDF would result in a net loss of functionality, mainframe systems continue to generate Postscript® output when submitting documents for printing. By generating Postscript® files, SPD commands can remain within the PDL file as described above and are supported by a wide range of Digital Frontends (DFEs). One current solution is the above-mentioned separate job ticketing to provide a separate file (Job Ticket), describing how the job is to be processed. However, one disadvantage of such an approach is that the Job Ticket assumes the PS file has been created. Yet in many cases it would be desirable to be able to start printing the PS file before it has been completely generated. In these cases, PS file creation, RIPping and printing all happen concurrently. The separate job ticketing imposes a needless constraint that can cause difficulties when printing very long print runs. Additionally, more detailed specifications can be provided if the Job Ticket information is written out directly with the PS file. The UI used to create the Job Ticket separately would be overly cumbersome to a user if it provided all of the available features and/or options that are possible by using predefined content rules. This would lead to an unnecessary source for errors. It would be less cumbersome and less error prone if the parameters could be concurrently embedded in the print job by the system creating the print job when the system is aware of the user context/contents of the print job. This is a particularly noticeable problem for mainframe printers having large print jobs. Large print jobs may comprise hundreds or thousands of print pages such as, e.g., in universities where a professor may put together courses including material selected from numerous sources, requiring different colors, separators, etc.

However, there is a need for a method that enables migrating embedded job ticketing workflows, e.g., SPD-based Postscript® workflows, to PDF workflows without losing job programming features or capabilities. It would be particularly advantageous for the migration method to have minimal impact on current systems currently utilizing SPD-based Postscript® workflows.

BRIEF DESCRIPTION

A method is provided for migrating from a first print file format to a second print file format while preserving embedded job ticket programming. The first print file is generated in the first print file format for one or more documents and includes embedded job ticket programming. The first print file is searched for the embedded job ticket data and the embedded job ticket data and associated page range identified by the searching are stored. The first print file is converted to the second print file in the second print file format and the stored job ticket data is inserted into the second print file as metadata. The second print file is then processed for printing or display.

Also provided is a method of preserving embedded job ticket data in a first print file of a first file format. The first print file is converted to a second print file of a second print file format. The conversion process includes translating the first print file to the second print file in the second print file format and searching the first print file for the embedded job ticket data and associated page ranges. The job ticket data and associated page ranges identified by the searching are inserted into the translated second print file.

Further, there is provided a system for converting a first print file having embedded job ticket data generated in a first format into a second print file of a second format and printing the second print file of the second format. The system includes a computer system having a CPU, a memory for storing instructions and data for execution by the CPU, an I/O unit for outputting an I/O stream based on the executed instructions, a storage device for storing and retrieving, a user interface for interacting with a user of the computer system, and a computer program. The computer program is configured to convert the first print file to the second print file of the second format by translating the first print file to the second print file, searching the first print file for the embedded job ticket data and associated page ranges, and inserting the embedded job ticket data and associated page ranges identified by the searching into the translated second print file. A printing system includes a digital frontend for processing a received I/O stream, an image output terminal for performing printing operations, and an interpreter unit operatively connected to the image output terminal for executing printer language instructions included in the received I/O stream for controlling the image output terminal. The interpreter unit is configured to parse the second print file for the inserted job ticket data and program a print job based on the parsed job ticket data.

DETAILED DESCRIPTION

Programming a print job is often achieved with a "job ticket". For many printing systems, the job ticket is provided in the form of one or more programmable dialogs, each programmable dialog including values which are selected with a user interface, such as, e.g., the user interface found in a DocuTech™ printing system manufactured by Xerox Corporation. Job tickets can vary dramatically in both structure and functionality. In one instance, the job ticket may assume the form of a relatively simple dialog displayed on a liquid crystal display ("LCD"). Attributes of a corresponding job, such as desired image processing, designated stock and finishing characteristics may be displayed for setting of suitable output values, e.g., stock size. Job ticketing is preferably performed on the system which creates an output document at a time prior to, or concurrent with creation of the output document. The job ticket may thereby contain system-generated data in addition to programmed data such as, e.g., time of creation, etc. It is advantageous, therefore, to maintain the programmed job ticket data with the printed document thereafter. Background information for job tickets, and an approach for setting attribute values therein, can be found in U.S. Pat. No. 5,271,065 to Rourke et al., the entire contents of which are incorporated herein by reference.

Figure 1:
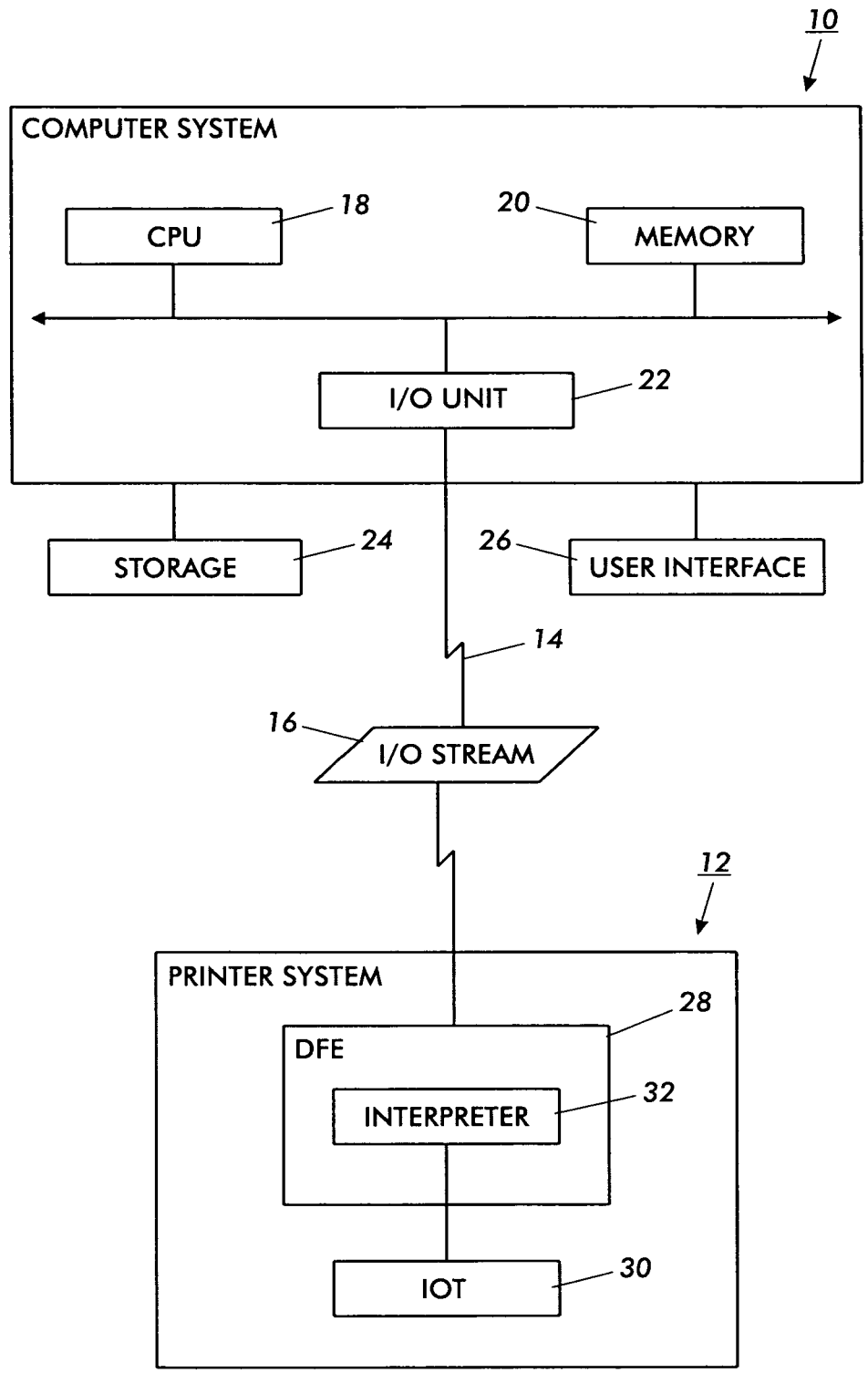
FIG. 1 is a block diagram of an exemplary printing system suitable for incorporating concepts of the present application.

With reference to FIG. 1, an exemplary system suitable for incorporating concepts of the present application is shown. A computer 10 is operatively connected to a printer 12 via a link 14 for the purpose of sending print jobs to the printer 12 in an I/O stream 16 provided to the printer. 12. Although the computer 10 and the printer 12 are shown as connected to each other by a network connection such as, e.g., of a LAN, they may be also be may be operatively connected by a WAN or even directly to each other by a bus. Further, especially in the case of a WAN connection, there may be server systems operative in the link between the computer 10 and the printer 12. Still further, although embodiments of the present application are described with reference to a single computer system, it is to be understood that the computer 10 may include multiple computer systems or computers operating either in parallel or serial fashion for performing various procedures described herein. Accordingly, the computer 10 may optionally be a distributed system as known in the art. However, for the sake of clarity in describing concepts of the present application, details of any connection between the computer 10 and the printer 12, or between computers of a distributed system, are not shown. In embodiments of the present application, when the link 14 is a LAN, the LAN may comprise an Ethernet® network, developed by the assignees of the present application, or the LAN may comprise other types of networks including a Novell®, 3Com® or IBM PC® LAN network. Moreover, devices external to the LAN may communicate with the LAN either by way of a network interface or by way of telephone lines through public branch exchanges ("PBX"), xDSL or ISDN connections. The present application is not limited with respect to the manner of operatively connecting the computer 10 to the printer 12, or by the nature and quantity of devices connected to the link 14. Further, although only a single computer and a single printer are shown, it is to be appreciated that concepts of the present application apply also to configurations including a plurality of computers and a plurality of printers in operative communication with each other.

In various embodiments of the present application, the computer 10 includes a central processing unit (CPU) 18, memory 20 and at least one I/O unit 22 which are coupled together by one or more buses. The computer 10 may further include external storage devices 24 and a user interface (UI) 26. The external storage devices 24 may include a hard-disk computer-readable medium, or any type of fixed or portable medium accessible by the computer 10 such as floppy-disks, compact-discs, digital-video discs, magnetic tape, optical disk, Ferro-electric memory, Ferro-magnetic memory, read-only memory, random access memory, electrically erasable programmable read-only memory, erasable programmable read-only memory, flash memory, static random access memory, dynamic random access memory, charge coupled devices, smart cards, or any other type of computer-readable medium. The memory 20 stores instructions and data either temporarily or permanently for execution by the CPU 18 for performing concepts of the present application, although some or all of these instructions and data may be stored elsewhere. Although the CPU 18 and memory 20 are shown in the same physical location, they may be located in different physical locations. It is also to be appreciated that the printer 12 may include a computer configuration similar to the computer 10 for performing all or portions of the concepts of the present application. However, again for the sake of clarity, this is not shown in detail in the printer 12.

The printer 12 includes a digital frontend (DFE) controller 28 and an image output terminal (IOT) 30. The DFE controller 28 processes print jobs received as I/O streams 16 from the computer 10 or other device on the link 14 for outputting a printed document in accordance with concepts of the present application as is described in further detail herein. In embodiments of the present application, the DFE controller 28 includes an interpreter unit 32. The interpreter unit 32 is operatively connected to the IOT 30 by one or more buses or a network connection. In embodiments of the present application, interpreter unit 32 preferably comprises a hardware or software implemented PDF interpreter including one or more processors, circuitry and memory storage devices (not shown), which may be coupled together by one or more buses, to execute PDF printer language instructions included in the I/O stream 16 for controlling the IOT 30 to perform printing operations. In addition to PDF instructions, interpreter unit 32 may be programmed or configured to execute other types of printer language instructions that may be included in the I/O stream 16 such as PostScript®, HP-GL, PCL, PCL5, GDI, ESC/P2, BJC or PJL/PCL instructions.

The IOT 30 preferably comprises a LASER raster output scanner, although the IOT 30 may comprise other types of output devices known in the art including, e.g., inkjet, dot-matrix, digital imagesetter or raster scan display devices. In embodiments of the present application, the IOT 30 directs one or more lasers, in response to the interpreter unit 32 as described above, toward a charged xerographic photoreceptor to discharge portions thereof in an image-wise pattern leaving unexposed areas charged during printing.

The I/O stream 16 transports one or more print jobs as files having one or more PDF printer language instructions which represents images and/or text generated by one or more device drivers or applications executed by the computer 10, although each print job or file may also comprise other printer language instructions such as, e.g., PostScript®, HP-GL, PCL, PCL5, PCL XL, GDI, ESC/P2, BJC or PJL/PCL instructions depending on the type of application generating the print job.

Figure 2:
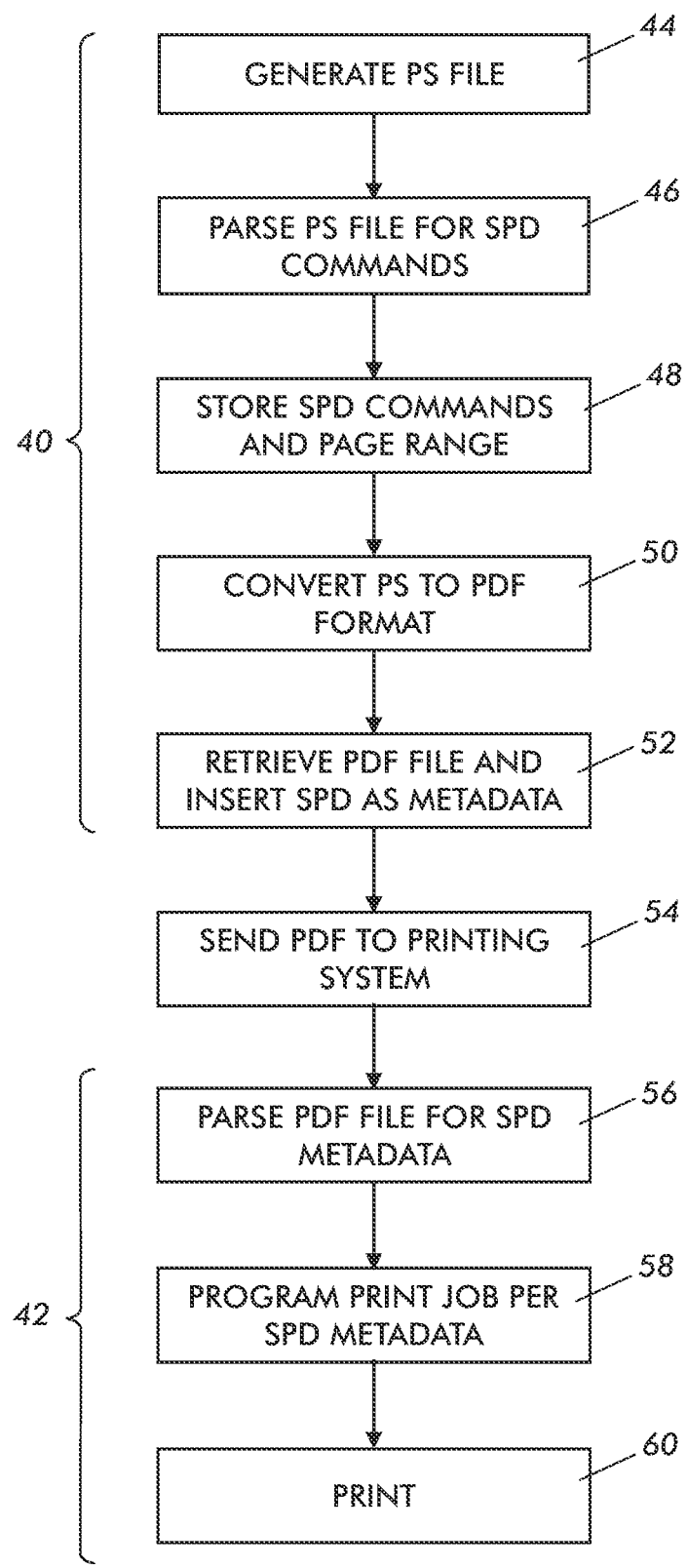
FIG. 2 is a flowchart of a process of the present application for preserving job ticket information.

With reference now to FIG. 2, and continuing reference to FIG. 1, a method according to concepts of the present application is shown. It is to be appreciated that, for purposes of explaining the present application, applications running on the computer 10 are generating PostScript® print jobs, i.e., the applications generate one or more PS files which are stored in memory 20 or storage 24 associated with the computer 10. It is also to be appreciated that the generated PS files may be stored remotely via a network or other means. It is to be further appreciated that although concepts of the present application are described with reference to PS files being converted to PDF files, that the concepts described herein apply also to any of the above-described printer language instructions, as well as printer language instructions not discussed herein.

This application preferably comprises two separate components (40, 42). These components may or may not be part of a single system but are described herein as being on separate systems. Further, although preferred embodiments incorporate concepts of the present application as separate components, the components may be combined into a single component as needed to suit particular printing environments. In overview, the first component 40 preferably works in cooperation with a PS to PDF conversion engine to extract embedded SPD commands from the input PS file and to place a copy of the SPD commands or a transformation of the SPD commands to the output PDF. The second component 42 then reads the preserved/transformed SPD command data from the PDF file and uses it to execute the original SPD commands or perform functions equivalent to the originally programmed SPD commands.

In one embodiment, an application running on the computer system 10 generates a PS file (44) with embedded SPD commands specifying, e.g., media options (plex modes, tabs, inserts, different colors, different weights, etc.) and/or finishing options (offset, staple, etc.), plus any desired exception programming for the print job. This is current behavior as known and often used in the art. The generated PS file is then presented to a conversion system utilizing the above-mentioned PS to PDF conversion engine for conversion to a PDF file. The conversion system parses the Postscript® file searching for SPD commands (46). The command content of each SPD command found is stored and the associated page range is noted and stored (48). The command content and associated page range may be stored in memory 20 or storage 24 as necessary. The PS file is then inputted to the PS to PDF conversion engine (50) for conversion to the PDF format. The PS to PDF conversion engine may be a proprietary conversion engine or any PS to PDF conversion engine known in the art such as, e.g., pdfLATEX. In this particular embodiment, the PS to PDF conversion engine does not need to be aware of the presence of embedded SPD commands.

The resulting PDF file is retrieved and the SPD commands are inserted into the PDF file as custom metadata (52). The inserted custom metadata can, if desired, be seen by the user in the Custom Document Properties of the resulting PDF file if opened in Adobe® Acrobat® or other suitable viewer. The inserted SPD commands may be stored in the PDF file in various ways. For example, the text of the SPD commands can be copied verbatim into metadata fields of the PDF file. In addition to copying the text of the SPD command, however, the affected pages should be identified in some manner. One way of associating the affected page range is to embed the affected page range in the Custom Metadata Name of Value. As long as the page range is embedded in a known location and in a known format (e.g., the format used for page range selection in a word processing print dialog such as with Microsoft® Word), the copied SPD command will be available for use downstream. Another way of associating the affected page range is to translate the .SPD commands into another job ticketing format such as, e.g., XPIF or JDF. This newly-created ticket can then be embedded into the PDF file as metadata that can also be parsed downstream. The resulting PDF file containing the embedded SPD command data in either case, will contain the SPD commands, whether copied verbatim or translated, as PDF metadata.

The PDF file containing the embedded SPD command data can be sent to any system or printer capable of processing PDF files (54). For example, the PDF file can be sent to FreeFlow™ Process Manager, a product of Xerox Corporation, where it can be color managed, imposed and submitted for printing. Since the original SPD commands are now stored as PDF metadata, the commands are advantageously automatically preserved by PDF editing tools known in the art.

In this embodiment, the printer or system receiving the PDF can raster image process (RIP) the file as it would RIP any other PDF file. However, some additional steps are performed. For instance, the PDF metadata is parsed and the information stored therein is stored in a memory or storage device (56). The system extracts the subset of the PDF metadata that contains job ticketing information to gather the SPD commands or the translated equivalent job ticket representation. In some embodiments, the subset is identified via an identifier on the custom metadata name. If the job ticket information is stored as verbatim SPD commands, the system uses the commands as is to invoke the appropriate subroutine that normally processes SPD commands (58) during or prior to the printing of the job (60). This particular approach has the benefit of maintaining fidelity to the original intent of the SPD commands because no translation is involved and a source of errors is thereby eliminated.

If, on the other hand, the job ticket information is stored in another job ticket format (e.g. XPIF, JDF), the system uses the job ticket data to program the job per nominal system behavior. This approach allows printing of jobs containing SPD commands by systems that do not support SPD. The above-described concept is not limited to PostScript® files. For example, the concept can be extended to conversion of other data streams that support embedded job tickets to PDF such as, e.g., PCL. While this application describes using the PDF metadata mechanism as a means to represent SPD command information, nothing precludes using other PDF features to represent the SPD information. For example, page piece dictionaries and marked content operators can be used. This concept can also be extended to the storing of SPD commands in any job ticket format supported by the device consuming the PDF. Optionally, the job ticket data is not embedded in the PDF file. The handling of the SPD information can depend on the capabilities of the downstream device that is used to print or process the SPD-based print job.

This present application can be further extended to include the concept of merging separate job ticket and PDF files into a single file. This single file can be archived in a repository for high fidelity reprint, transferred over the web (e.g., e-mail) or otherwise processed by internal or external systems. Advantageously, these systems are not required to associate the original job ticket and PDF files with each other.

Figure 3:
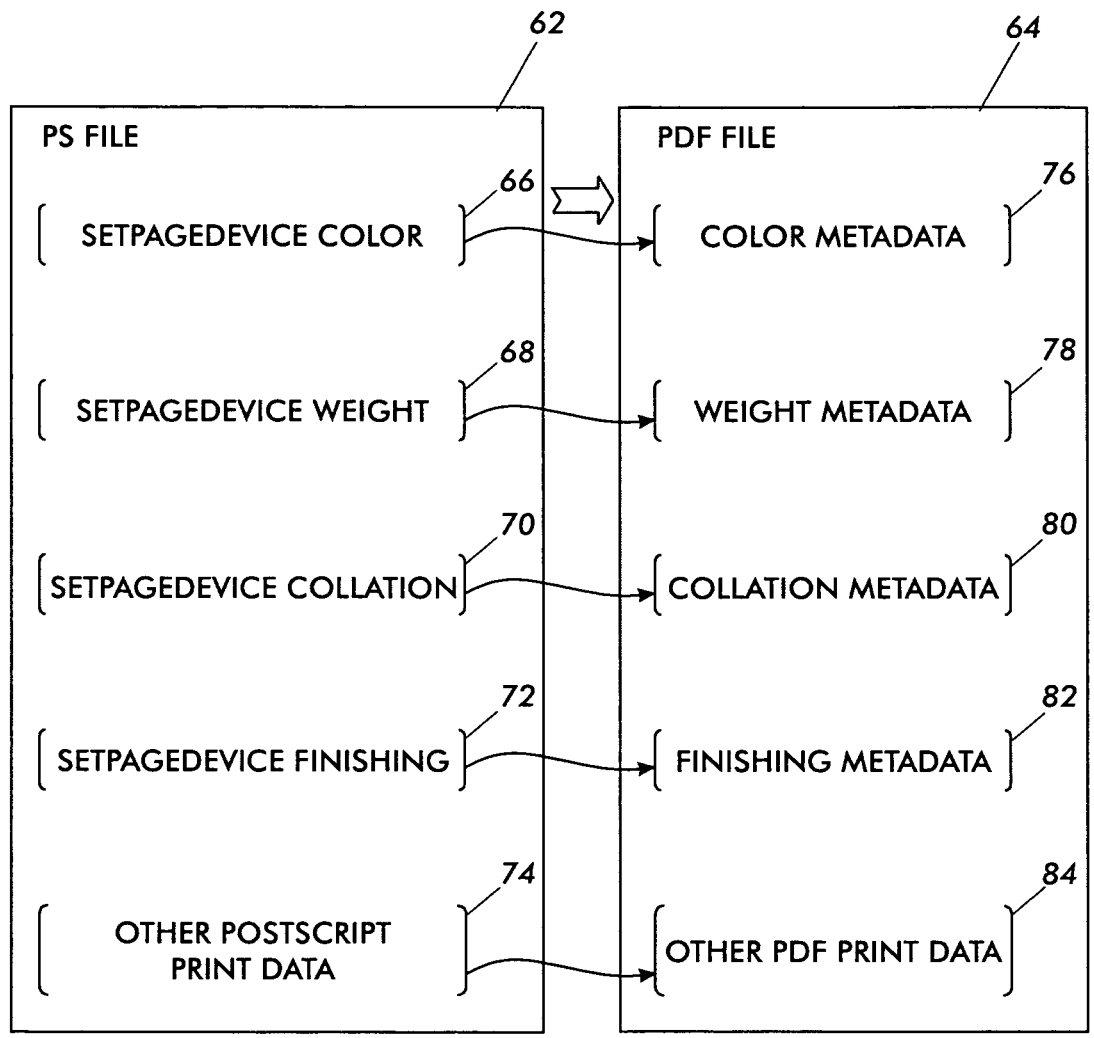
FIG. 3 is a block diagram showing an exemplary PS to PDF conversion according to concepts of the present application.

With reference to FIG. 3, the concept of transferring SPD command data from a PS file to a PDF file is illustrated for one embodiment of the present application. A generated PS file 62 (input) is shown beside a converted and processed PDF file 64 corresponding to an output as described with reference to step 52 in FIG. 2. The exemplary PS file includes embedded SPD command data such as, e.g., SPD paper color commands 66, SPD paper weight commands 68, SPD collation commands 70, and SPD finishing commands 72. The PS file, of course, also contains the PS print data 74 corresponding to the document or documents represented by the exemplary PS file. The converted and processed PDF file 64 includes metadata incorporating either verbatim or translated versions of the input SPD command data such as, e.g., paper color metadata (76), paper weight metadata (78), collation metadata (80), and finishing metadata (82). Finally, the PDF file includes the PS print data 74 translated as necessary to the PDF format 84. It is to be appreciated that the content of the illustrated data in the PS file and the PDF file is not shown in any particular order or format. The particular order and content of any embodiment is limited only by requirements of the particular PS and PDF implementations.

The preservation of SPD commands and respective page associations in a PDF file format using PDF metadata beneficially provides a nearly universally supported container for the job ticket information. As such, concepts of the present application provide resilient and portable forms of job ticketing. PDF metadata can hold the SPD command content and, as such, the SPD commands can be concise unlike other forms of job ticketing known in the art such as JDF tickets. Furthermore, since the PDF metadata reflects the content of the SPD commands, systems that support SPD commands can be easily transitioned to utilizing SPD information embedded in PDF files as PDF metadata. The PDF representational mechanisms utilized in embodiments of the present application enable applications familiar with the added information (SPD metadata) to process and make use of it and, on the other hand, those applications not familiar with or uninterested in the added information can ignore it. In other words, added information does not interfere with normal PDF processing by other applications.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of migrating from a first print file format to a second print file format, the method comprising:
   converting a Postscript (PS) print file to a PDF print file, including:
      receiving the PS file including embedded setpagedevice (SPD) commands;
      searching the PS file for the embedded SPD commands and identifying SPD command content and a page range associated with each command content;
      extracting and storing the SPD command content with the associated page ranges;
      after the extracting, converting the PS file to the PDF file; and
      after the converting, translating the SPD command content into PDF compatible printer language instructions; and,
      inserting a copy of the instructions and page ranges as metadata into the PDF and storing the instructions in the PDF as a single file.

2. The method set forth in claim 1, further comprising:
   in response to a print instruction, parsing the PDF file for the metadata; and
      reading the metadata to execute the print job according to an original intent of the SPD commands in a system that does not support PS commands.

3. A method of preserving embedded job ticket data in a first print file of a first file format, the method comprising:
   searching a PS file for embedded SPD commands and identifying SPD command content and a page range associated with each command content;
   extracting and storing the SPD command content with the associated page ranges;
   after the extracting, converting the PS file to the PDF file;
   after the converting, translating the SPD command content into PDF compatible printer language instructions; and,
   inserting a copy of the instructions and page ranges as metadata into the PDF and storing the instructions in the PDF as a single file;
   in response to a print instruction, parsing the PDF file for the metadata; and
   reading the metadata to execute the print job according to an original intent of the SPD commands.

4. The method set forth in claim 3, wherein the translating of the setpagedevice commands to the PDF is verbatim.

5. The method set forth in claim 3, wherein the executing includes:
   programming a function on a non-PostScript printer device according to the original intent of the SPD commands compatible with an associated PostScript printer device.

6. The method set forth in claim 3, wherein the programming the print job includes performing at least one function based on the translated setpagedevice commands which is equivalent to an intent of the embedded setpagedevice commands.

7. A system for converting a first print file having embedded job ticket data generated in a first format into a second print file of a second format and printing the second print file of the second format, the system comprising:
   at least one computer system comprising:
      a CPU;
      a memory for storing instructions and data for execution by the CPU;
      at least one I/O unit for outputting an I/O stream based on the executed instructions; and
      at least one storage device for storing and retrieving;
   at least one user interface for interacting with a user of the at least one computer system;
   computer software configured to operate on the at least one computer system for converting the first print file of a Postscript (PS) format to the second print file of a second PDF format, the converting including:
      searching a PS file for embedded SPD commands and identifying SPD command content and a page range associated with each command content;
      extracting and storing the SPD command content with the associated page ranges;
      after the extracting, converting the PS file to the PDF file; and,
      after the converting, translating the SPD command content into PDF compatible printer language instructions; and, inserting a copy of the instructions and page ranges as metadata into the PDF and storing the instructions in the PDF as a single file; and
   a printing system comprising:
      a digital front end for processing a received I/O stream;
      an image output terminal for performing printing operations; and
      an interpreter unit operatively connected to the image output terminal for executing printer language instructions included in the received I/O stream for controlling the image output terminal, wherein the interpreter unit is configured to perform:
         in response to a print instruction, parsing the PDF file for the metadata; and
         reading the metadata to execute the print job according to an original intent of the SPD commands.

8. The system set forth in claim 7, wherein the translating is verbatim.

9. The system set forth in claim 7, wherein the printing system comprises a xerographic system.

* * * * *